United States Patent
Barton et al.

(10) Patent No.: US 8,881,883 B2
(45) Date of Patent: Nov. 11, 2014

(54) PARK LOCK FOR NARROW TRANSMISSION

(75) Inventors: Augusto E. Barton, Palo Alto, CA (US); William Randall Fong, Hayward, CA (US); Gary Allen Pinkley, Union City, CA (US); Edwin Marcum Pearce, Jr., San Francisco, CA (US); Kunio Morisawa, Toyota (JP); Kazunori Kaneko, Toyota (JP); Koichi Tanaka, Okazaki (JP)

(73) Assignees: Tesla Motors, Inc., Palo Alto, CA (US); Toyota Motor Engineering & Manufacturing North America, Inc., Erlanger, KY (US)

( * ) Notice: Subject to any disclaimer, the term of this patent is extended or adjusted under 35 U.S.C. 154(b) by 44 days.

(21) Appl. No.: 13/460,349

(22) Filed: Apr. 30, 2012

(65) Prior Publication Data
US 2013/0284559 A1    Oct. 31, 2013

(51) Int. Cl.
*F16H 63/38*    (2006.01)
*B60T 1/06*    (2006.01)

(52) U.S. Cl.
USPC ............ 192/219.5; 188/31; 188/69; 74/411.5

(58) Field of Classification Search
CPC .............................. F60T 1/005; F16H 63/3416
USPC ...................................... 192/219.5; 74/411.5
See application file for complete search history.

(56) References Cited

U.S. PATENT DOCUMENTS

| 4,727,967 A * | 3/1988 | Ogasawara et al. ........ 192/219.5 |
| 2009/0200134 A1 | 8/2009 | Shintani |
| 2012/0145512 A1 | 6/2012 | Kim et al. |

FOREIGN PATENT DOCUMENTS

| DE | 102008011115 A1 | 8/2009 |
| WO | 2011024284 A1 | 3/2011 |

OTHER PUBLICATIONS

European Search Report for application 13165964.1-1756, dated Aug. 21, 2013.

* cited by examiner

*Primary Examiner* — Troy Chambers
*Assistant Examiner* — Lillian Nguyen
(74) *Attorney, Agent, or Firm* — Dinsmore & Shohl LLP

(57) ABSTRACT

A park lock of a transmission, including a park gear; a park pawl rotating about a pawl shaft, the park pawl having a pawl portion locking the park gear, the park pawl including a cam contact portion; a park rod responsive to an operation of a controller, the park rod having a cam portion pressing the cam contact portion to have park pawl engage the park gear; a park sleeve receiving the cam portion and defining a first contact point providing a reactive force to the cam contact portion of the park pawl pressing against the cam portion at a second contact point; a pawl torsional spring biasing the park pawl towards disengagement; and a pawl stopper limiting the rotation of the park pawl wherein motions are constrained within a plane of the transmission and components are rotatingly disposed in parallel axis bores in one half of a transmission case.

15 Claims, 9 Drawing Sheets

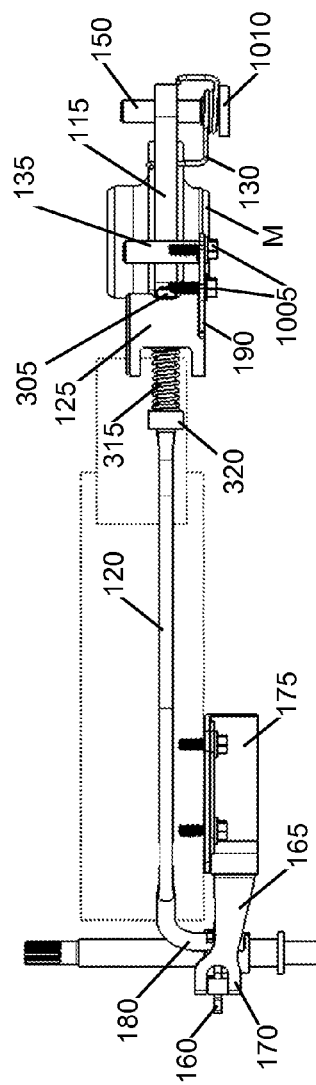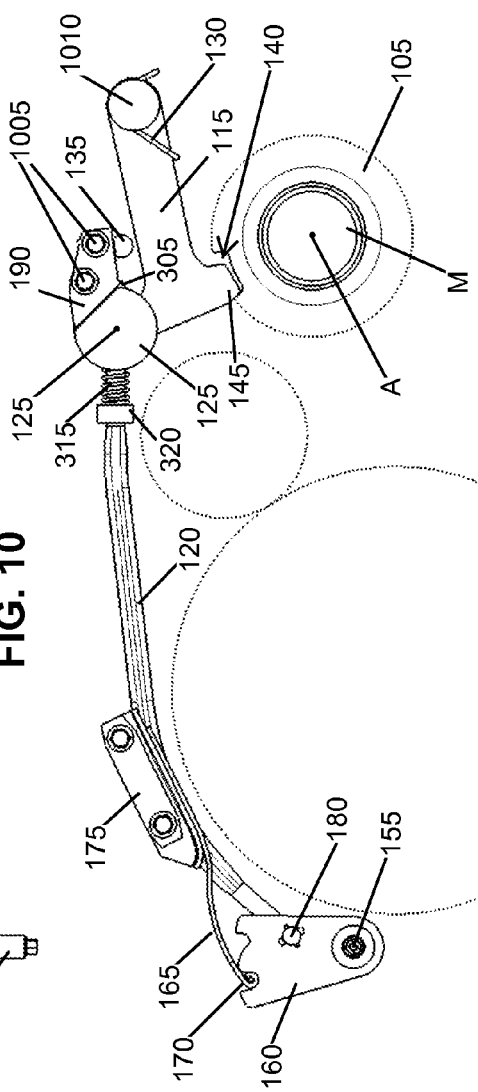
FIG. 10
FIG. 11

PARK LOCK FOR NARROW TRANSMISSION

BACKGROUND OF THE INVENTION

The present invention relates generally to mechanical park locking for vehicle transmissions, and more specifically, but not exclusively, to a park lock mechanism for narrow transmissions having tight packaging and weight constraints.

Park lock devices for automotive vehicle transmissions are notoriously well known as a general proposition. Transmissions have continued to evolve, and park lock devices disposed within such transmissions also need to evolve. For example, a particular transmission for an electric vehicle (EV) is quite narrow as it is positioned between an electric motor on one side and an inverter on the other side. Where many conventional park lock devices are implemented in two planes, a narrow transmission of an electric vehicle prevents implementation of such conventional solutions. Further, many conventional park lock devices include a park lock controller near the parking gear. The narrow transmission having large areas covered by the motor on one side and the inverter on the other limits such conventional location of the park lock controller.

Mechanical cooperation of the components of such transmissions preferably meet a number of operational goals in addition to provision of a park mode and a not parked mode. These operational goals in some cases are actual requirements and include resistance to park engagement while the vehicle is moving. As soon as the speed of the vehicle falls below the lock speed while park mode is commanded, the park lock device should automatically engage to safely enter into the park mode and stop the vehicle. The transmission should then remain parked until the vehicle is transitioned to the not parked mode. Irrespective of a slope on which the EV is stopped, the transmission should not provide too great of mechanical resistance to mode transition.

While not necessarily required by the narrowness of the EV transmission, systems on EVs have tight budgets for space and weight. These budget constraints work against a straightforward implementation of a park lock device for a narrow transmission such as may be contemplated to be used in an EV. What is needed is a system and method for a park lock mechanism for narrow transmissions having tight packaging and weight constraints.

BRIEF SUMMARY OF THE INVENTION

Disclosed is a system and method for a park lock mechanism for narrow transmissions having tight packaging and weight constraints. A novel architecture reduces part count to implement a robust one-dimensional remotely-actuated self-aligning park lock device in a narrow transmission that is appropriate for use in an electric vehicle or the like.

The following summary of the invention is provided to facilitate an understanding of some of technical features related to narrow transmission park lock devices, and is not intended to be a full description of the present invention. A full appreciation of the various aspects of the invention can be gained by taking the entire specification, claims, drawings, and abstract as a whole. The present invention is applicable to other transmission systems other than electric passenger vehicles.

A park lock device of a narrow transmission includes a park gear provided in a transmission case at a rotational axis which rotates together with a wheel axle; a park pawl provided in the transmission case so as to rotate about a pawl shaft coupled to a proximal end of the park pawl, the park pawl having a pawl portion at a distal end which locks the park gear through an engagement therebetween wherein the park pawl further includes a body portion coupling the proximal end to the distal end and a cam contact portion at the distal end opposing the pawl portion; a park rod provided in the transmission case so as to move together with an operation of a controller, the park rod having a cam portion which presses the cam contact portion of the park pawl so as to make the engagement between the pawl portion of the park pawl and the park gear according to the operation of the controller; a park sleeve receiving the cam portion of the park rod and defining a first contact point providing a reactive force to the cam contact portion of the park pawl pressing against the cam portion of the park rod at a second contact point; a pawl torsional spring, coupled to the pawl shaft, biasing a rotation of the park pawl about the pawl shaft towards a disengagement of the park gear and the pawl portion to unlock the park gear; and a pawl stopper provided in the transmission case to limit the rotation of the park pawl by contacting the body portion of the park pawl; wherein motion of the park gear, the park pawl, and the park rod are constrained within a vertical plane of the transmission case.

A park lock method for a narrow transmission case, the method responsive to a controller to selectively engage a park gear provided for rotation in a plane of the narrow transmission case at a rotational axis which rotates together with a wheel axle, the method including a) moving, within the plane of the narrow transmission case, a park rod together with an operation of the controller remotely disposed from the park gear, the park rod including a cam portion; b) pressing the cam portion against a cam contact portion of a park pawl disposed within the narrow transmission case to engage the park gear when the operation of the controller commands a park mode, the park pawl rotatable within the plane about a pawl shaft disposed at a proximal end of the park pawl with the park pawl including a pawl portion at a distal end that engages the park gear in the park mode wherein the cam contact portion is also disposed at the distal end opposing the pawl portion and interacts with the cam portion within a self-aligning rotatable park sleeve; c) releasing the cam portion from the cam contact portion of the park pawl to disengage the park gear when the operation of the controller commands a not park mode; and d) rotating the park pawl to disengage the pawl portion from the park gear responsive to a disengagement-biasing torsional spring coupled to the pawl shaft after the cam portion has been released from the cam contact portion wherein a self-aligning pawl stopper is rotatably disposed proximate a body portion of the park pawl to limit disengaging rotation of the park pawl with the body portion joining the proximal end to the distal end.

There are a number of features, benefits, and advantages of the present invention, with implementations of the present invention including reduced stresses and fewer mounting requirements for the park lock device components. Some features include including use of a self-aligning park sleeve that does not experience any net moment under parked load, a bracket simply retains both the park sleeve and pawl stopper within alignment limits, and provides safe operation in a parked mode and a not parked mode.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 10 illustrates a top view of the park lock device components from FIG. 2 (park mode) isolated from the transmission case;

FIG. 11 illustrates a side view of the park lock device components of FIG. 10;

DETAILED DESCRIPTION OF THE INVENTION

Embodiments of the present invention provide a system and method for a park lock mechanism for narrow transmissions having tight packaging and weight constraints. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
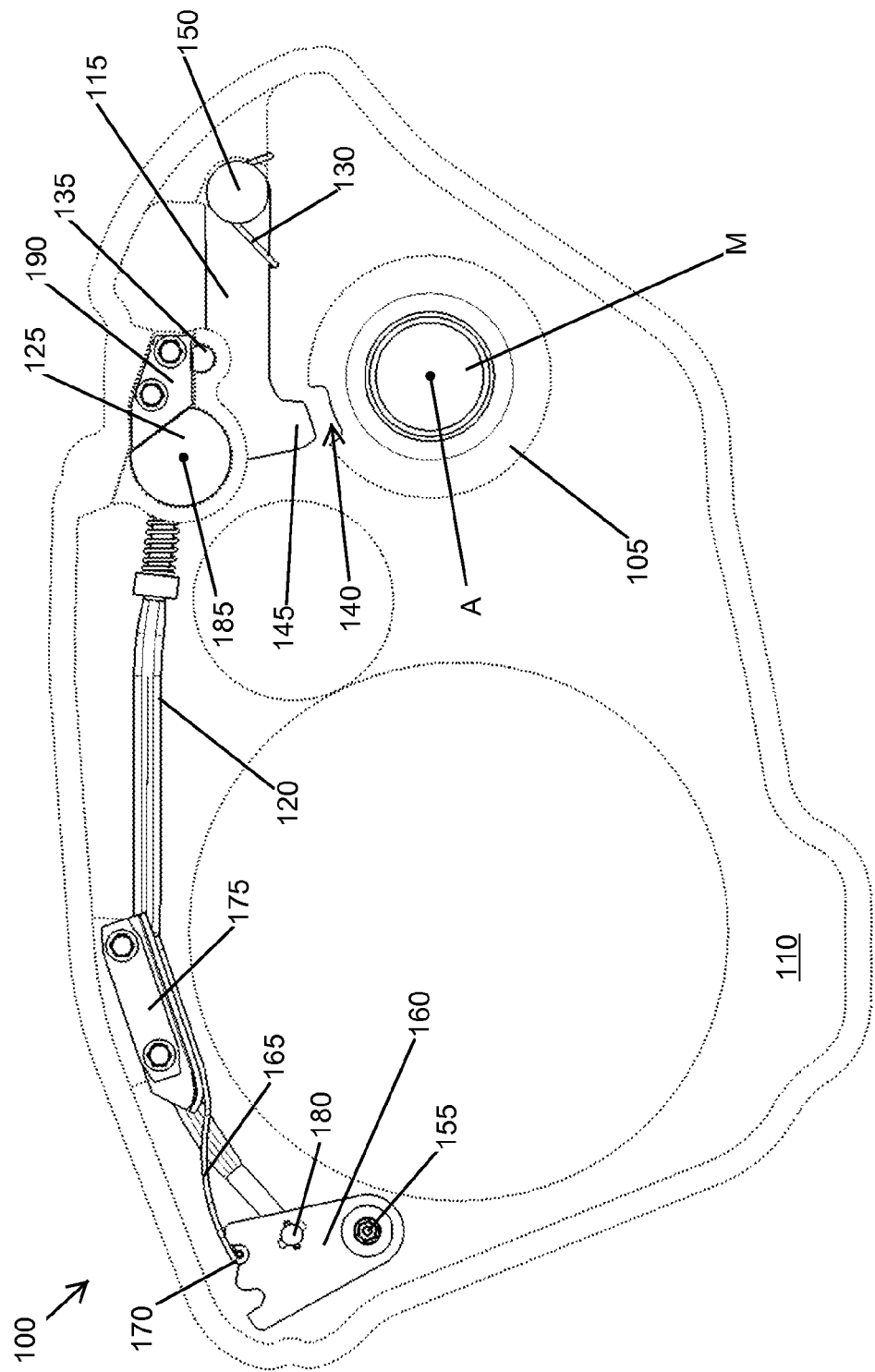
FIG. 1 illustrates a side view of a narrow transmission including a park lock device, the park lock device in a "not parked" mode.
Figure 2:
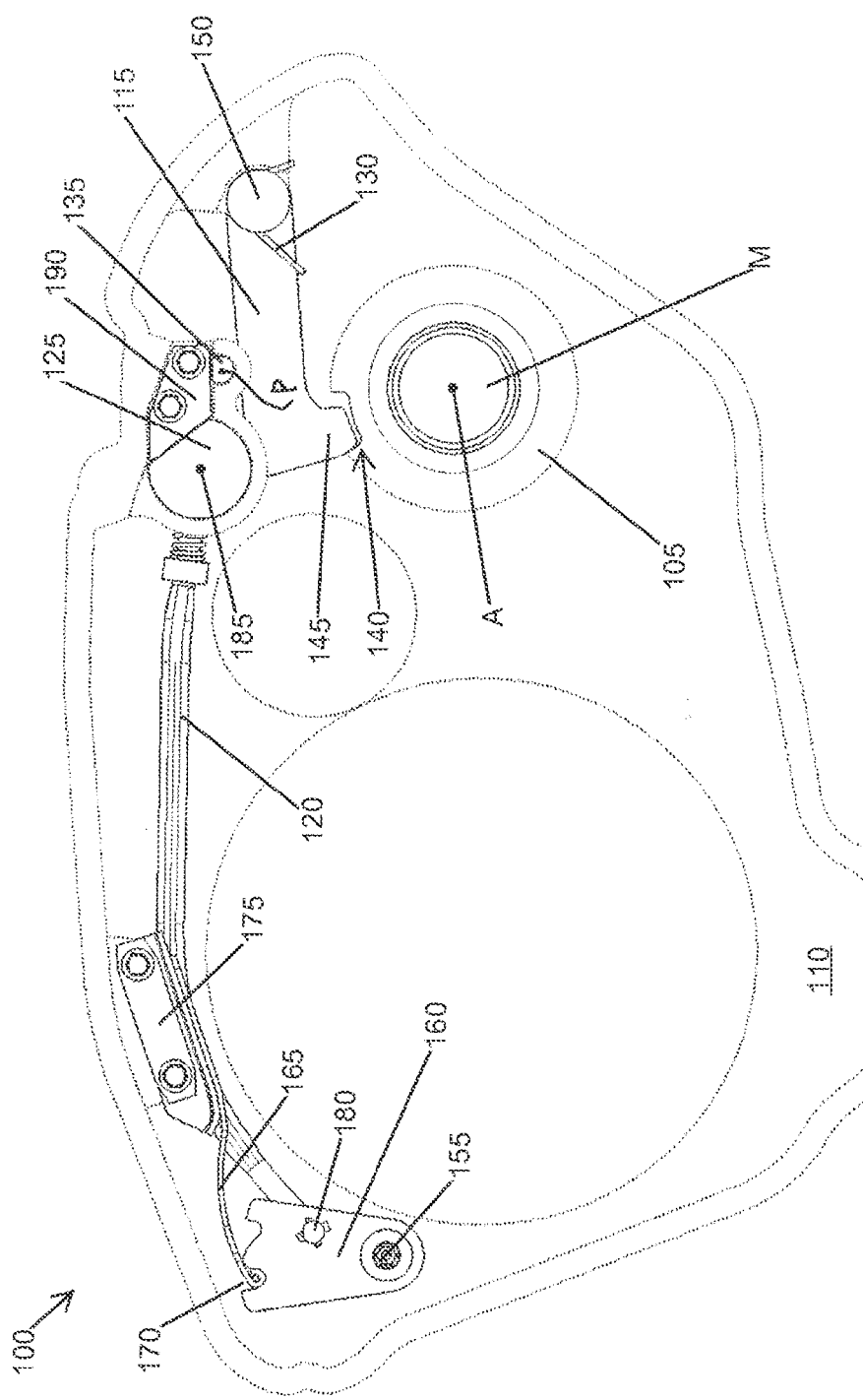
FIG. 2 illustrates a side view of the narrow transmission illustrated in FIG. 1 with the park lock device in a "parked" mode.

FIG. 1 illustrates a side view of a narrow transmission 100 including a park lock device, the park lock device in a "not parked" mode or position, and FIG. 2 illustrates a side view of narrow transmission 100 including the park lock device in a "parked" mode or position. The park lock device is a mechanical interlock that selectively engages with and disengages from a park lock gear 105. Park lock gear 105 includes a rotational axis A which rotates together with a motor axis M within a transmission case, motor axis M coupled in turn to a wheel axis of a vehicle. The transmission case includes a pair of complementary mating half cases, a back half case 110 shown in FIG. 1.

The park lock device includes a cooperating set of components: a park pawl 115, a park rod 120, a park sleeve 125, a pawl torsional spring 130, and a pawl stopper 135. These components move within a single plane defined by the transmission case and are supported by the transmission case as further described herein.

Park lock gear 105 includes an outside diameter perimeter having a number N of distributed uniform concave portions 140. Concave portions 140 cooperate with a pawl portion 145 of park pawl 115 for producing the modes described herein, those modes including the parked mode and the not parked mode. Park pawl 115 rotates about a pawl shaft 150 when pawl portion 145 engages with, and disengages from, concave portions 140.

The engaging/disengaging rotation of park pawl 115 is initiated by a movement of park rod 120. As further detailed below, park rod 120 and park pawl 115 make contact inside of park sleeve 125, with the consequence that the park lock device enters into one of its modes (as further determined by the operational state of the other components of narrow transmission 100).

The movement of park rod 120 is responsive to a controller (not shown) that commands one of the parked mode and the not parked mode for narrow transmission 100. While there are many types of controllers, in the present example, a software-controlled electromagnetic rotary actuator controls a rotation of a control shaft 155. Control shaft 155 rotates between a not parked position (in FIG. 1) and a parked position (FIG. 2). Control shaft 155 rotates when making these transitions between parked and not parked positions, however due to the nature of such electromechanical actuators, control shaft 155 sometimes does not exactly rotate.

Narrow transmission 100 compensates for any inexact rotation by mechanically limiting/finishing rotation of control shaft 155 by use of a detent plate 160. Detent plate 160 includes a cam profile with two detents, one detent corresponding to the park position and one detent corresponding to the not parked position. The cam profile includes a number of curves and slopes joining the two detents. A detent spring 165 includes a cam profile follower 170 that limits any over rotation of control shaft 155 in both rotational directions due to physical stops at outside edges of the detents. Cam profile follower 170 inhibits any under rotation of control shaft 155 in both directions by either finishing a rotational transition or returning control shaft to its pre-transition position. The specifics are determined by the amount of actual rotation of control shaft 155 and where cam profile follower 170 is placed along the cam profile.

Detent spring 165 exerts sufficient torque on control shaft 155 through interaction with detent plate 160 to follow the cam profile and rotate control shaft 155 until cam profile follower 170 engages one of the two detents. A required torque to actuate parked mode from not parked mode is kept below a minimum torque provided by detent plate 160 and interacting detent spring 165. In the embodiment of FIG. 1, the cam profile is not symmetric having a different set of conditions to transition from parked to not parked as compared to a set conditions to transition from not parked to parked. The curves and slopes of the cam profile are configured to provide the desired response to rotational uncertainty in control shaft 155 and a required amount of torque for detent spring 165 for those desired responses.

Due to tight packaging requirements in the transmission case, detent spring 165 is a leaf spring mounted laterally from back half case 110 using a support 175 rather than having detent spring 165 mounted directly to the transmission case on the top or bottom surface of the spring in a conventional fashion. The particular configuration of detent spring 165 provides the necessary torques for cam profile follower 170 to affect movement of detent plate 160 while being sufficiently rigidly supported.

A proximal end 180 of park rod 120 includes a ninety degree bend provided with swaged elements to engage rotationally a mating aperture on detent plate 160. Engagement/disengagement of the swaged end with detent plate 160 requires a rotation of control shaft 155 beyond the detent positions and therefore the swaged elements prevent accidental disengagement during operation.

The coupling of proximal end 180 to detent plate 160 converts rotation of control shaft 155 to lateral translation of park rod 120. A distal end of park rod 120 (not shown in FIG. 1 because park rod 120 terminates within park sleeve 125) converts translation of park rod 120 into mechanical control of park pawl 115 as further described below. Pawl torsional spring 130, coupled to pawl shaft 150, rotationally biases park pawl 115 upwards and away from engagement with park lock gear 105. The translation of park rod 120 overcomes this bias in appropriate situations to rotate park pawl 115 downwards toward engagement with park lock gear 105.

Park sleeve 125 includes a cylindrical perimeter and rotates about a transverse axis 185 relative to back half case 110. This rotation of park sleeve 125 allows self-alignment in response to internal interactions of park rod 120 and park pawl 115. A magnitude of rotation of park sleeve 125 is limited by a bracket 190 coupled to a complementary external cutout in park sleeve 125.

Pawl stopper 135 also includes a generally cylindrical perimeter and rotates about a transverse axis relative to back half case 110. This rotation of pawl stopper 135 allows self-alignment in response to impacts of park pawl 115. A magnitude of rotation of pawl stopper 135 is limited by bracket 190 coupled to a complementary external cutout in pawl stopper 135. Bracket 190 thus concurrently retains both park sleeve 125 and pawl stopper 135 while permitting both structures to independently self-align to help meet space and weight budgets.

A feature of the disclosed embodiment is that transverse axis 185, the transverse axis of pawl stopper 135, a rotational axis of pawl shaft 150, and a rotational axis of control shaft 155 are all parallel. A manufacturing and assembly advantage of the disclosed embodiment of the present invention is that these elements engage and rotate within parallel bores disposed in back half case 110. A milling machine would be able to create all these bores in a single pass without removing/repositioning back half case 110 in between creation of some of the bores. This means that all of the bores are all accurately positioned relative to each other. This improves assembly accuracy as the functional positions of these components are fixed without use of other parts. In contrast, if this assembly required machining in multiple planes, the resulting accuracy of those assembly would be less than an assembly able to be machined in a single plane.

One critical component is positioning and operation of park sleeve 125. Because park sleeve has a cylindrical perimeter it is easily installed into back half case 110 by inserting it into one of these accurately positioned bores. No other parts or brackets are needed to determine the operational position of park sleeve. The assembly is simplified in this fashion because no high accuracy position fixing bracket is required (such brackets can be complicated and possibly more expensive). A loose tolerance anti-rotation alignment bracket that limits rotation of park sleeve 125 replaces any position fixing bracket.

Figure 3:
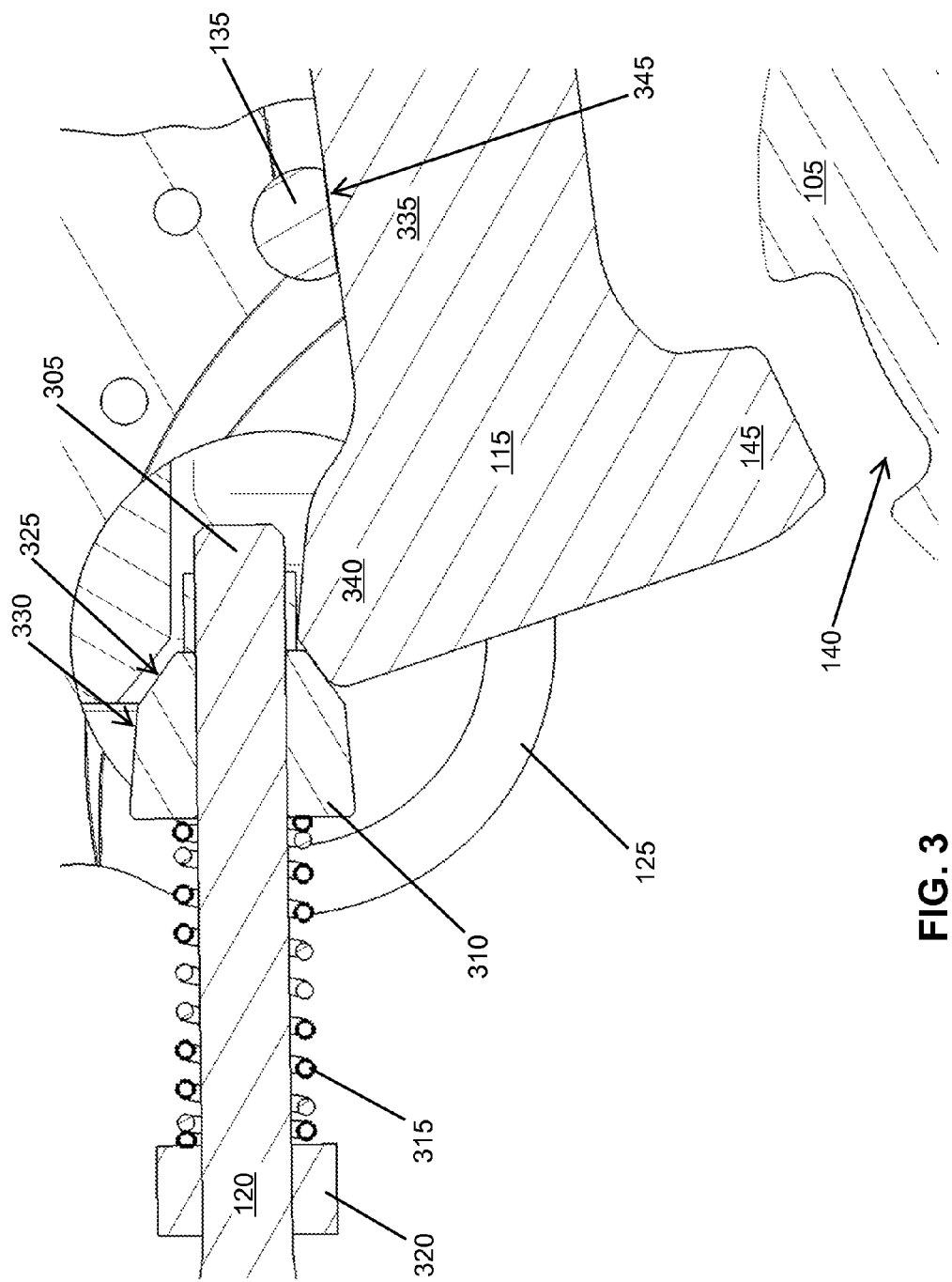
FIG. 3 illustrates a sectional view of a portion of the park lock device of FIG. 1 depicting an interaction of the park rod and the park pawl inside the park sleeve.
Figure 4:
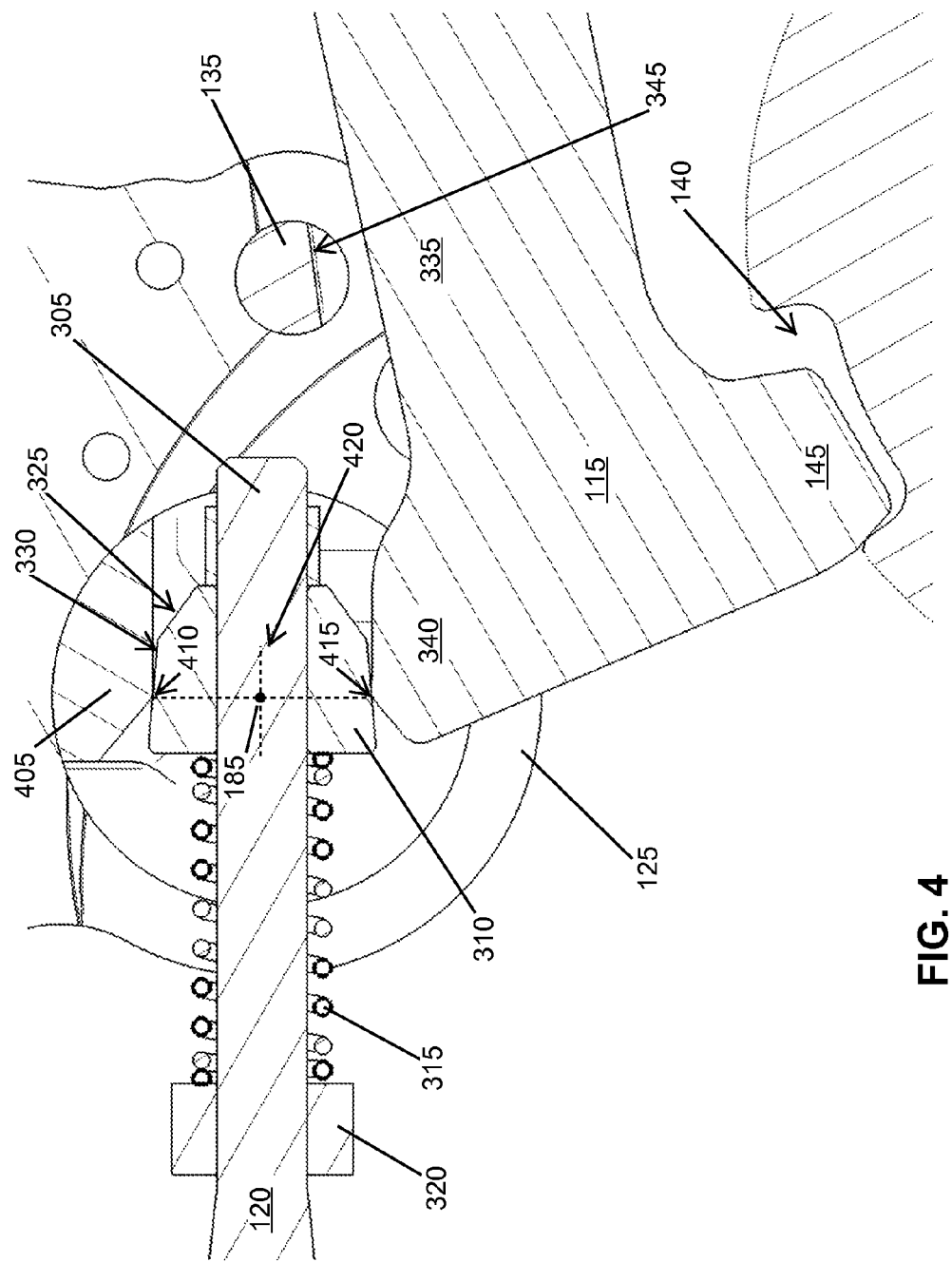
FIG. 4 illustrates a sectional view of a portion of the park lock device of FIG. 2 depicting an interaction of the park rod and the park pawl inside the park sleeve.
Figure 5:
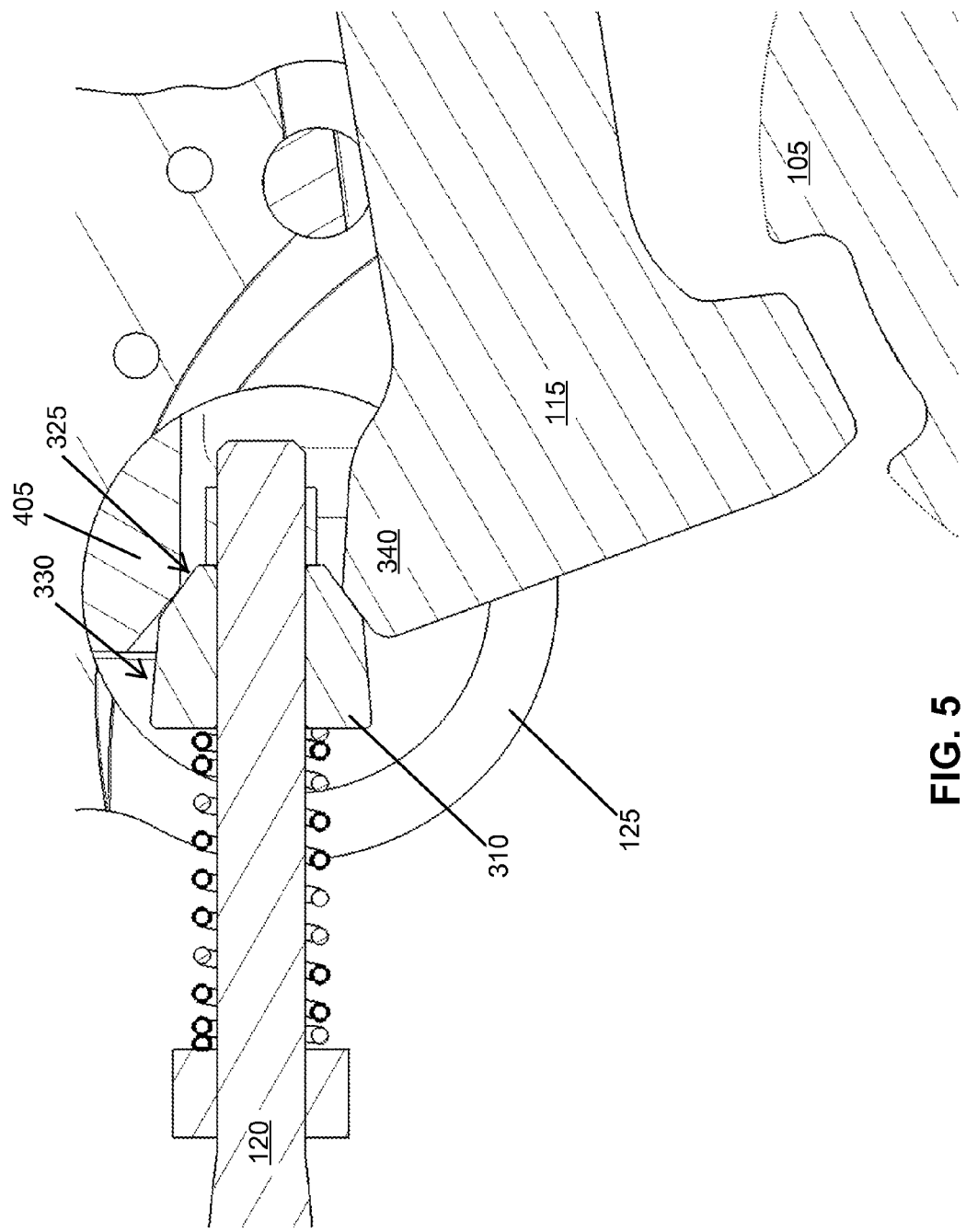
FIG. 5 illustrates a sectional view of a portion of the park lock device detailing a transition between the parked mode and the not parked mode.

FIG. 3 illustrates a sectional view of a portion of the park lock device of FIG. 1 depicting an interaction of park rod 120 and park pawl 115 inside park sleeve 125 (not parked mode), FIG. 4 illustrates a sectional view of a portion of the park lock device of FIG. 2 depicting an interaction of park rod 120 and park pawl 115 inside park sleeve 125 (parked mode), and FIG. 5 illustrates a sectional view of a portion of the park lock device detailing component orientation during transitions between the not parked mode of FIG. 1 and the parked mode of FIG. 2.

Park rod 120 includes a distal end 305 (e.g., a tip of park rod 120) opposite from proximal end 180 with a cam portion 310 disposed at distal end 305 and secured with an end stop. Cam portion 310 slidingly engages distal end 305 to move along park rod 120 between an extended position and a compressed position. A cam spring 315 disposed on distal end 305 between cam portion 310 and a stop 320 biases cam portion 310 towards the extended position. In the section view of FIG. 3, cam portion 310 includes two sloped portions: a steep forward portion 325 and a shallower rearward portion 330 (while appearing flat, in actuality these surfaces are radially symmetric).

Park pawl 115 includes pawl portion 145 at a distal end away from pawl shaft 150. Pawl portion 145 locks park lock gear 105 by engaging one uniform concave portion 140. Park pawl 115 further includes a body portion 335 joining pawl shaft 150 to the distal end and a cam contact portion 340 also at the distal end opposing pawl portion 145. Body portion 335 is laterally flat with pawl stopper 135 including a complementary flat chord 345 disposed on an intermediate portion of its cylindrical outer surface (that engages back half case 11), flat chord 345 rotating to align with body portion 335 when pawl stopper 135 is impacted by body portion 335. Pawl stopper 135, when self-aligning, rotates about its transverse axis P so that flat chord 345 is substantially parallel to body portion 335. Providing flat chord 345 over the entire width of body portion 335 distributes a contact load from each body portion 335 impact with pawl stopper 135 over a sufficiently large area that contact stresses are reduced to a desired level.

In FIG. 4, park sleeve 125 includes an internal cam follower portion 405 that contacts cam portion 310 at a first contact point 410 along the slopes of cam portion 310. First contact point 410 moves along cam portion 310 as cam portion 310 moves in and out of park sleeve 125. (Note that there are some instances when park sleeve 125 does not contact cam portion 310 during operation of the park lock device.) Cam contact portion 340 contacts cam portion 310 at a second contact point 415 along the slopes of cam portion 310. Second contact point 415 moves along cam portion 310 as cam portion 310 moves in and out of park sleeve 125 and park pawl 115 rotates.

In the parked mode shown in FIG. 4, park sleeve 125 has self-aligned to produce a substantially zero resultant moment. The zero resultant moment is a consequence of the following particular arrangements. Park rod 120 is cylindrical at proximal end 180 and distal end 305, distal end 305 including a longitudinal axis 420. A line of action passes approximately through the transverse axis which is approximately passed through the center of park sleeve 125. Longitudinal axis 420 is perpendicular to both a first imaginary line extending between transverse axis 185 and first contact point 410 as well as a second imaginary line extending between transverse axis 185 and second contact point 415. This configuration provides that the resulting moment on park sleeve 125 is zero regardless of an angle that rearward portion 330 makes at first contact point 410, a distance from transverse axis 185 to first contact point 410 or a magnitude of a force F at first contact point 410. Further, park sleeve 125 self-aligns so that the distance from transverse axis 185 to first contact point 410 matches a distance from transverse axis 185 to second contact point 415. Due to the resulting symmetric loading with respect to longitudinal axis 420 the resultant moment is also zero. Configuring park sleeve 125 and park rod 120 for relative self-alignment in park mode in this way provides two mechanisms to produce a zero resultant moment that reduces unnecessary stress on the park lock device.

Both park sleeve 125 and pawl stopper 135 rotate for self-alignment, with bracket 190 used for both retaining them within back half case 110 at about the proper alignment and limiting the magnitudes of their rotations during self-alignments. Bracket 190 attaches to back half case 110 to "trap" park sleeve 125 and pawl stopper 135 while the external cuts on outside edges of park sleeve 125 and pawl stopper 135 engage bracket 190 to provide the rotation limitation. The park sleeve 125 rotation range allows for cam portion 310 to freely enter and exit during transitions of the park lock device between modes. Pawl stopper 135 rotation range allows for impacts by body portion 335 to rotate pawl stopper 135 so flat chord 345 is substantially parallel to body portion 335.

Two primary modes have been described above: parked mode and not parked mode. In normal operation, the park lock device transitions from the not parked mode shown in FIG. 1 to the parked mode shown in FIG. 2 and transitions from the parked mode to the not parked mode as determined by the controller. When transitioning from the parked mode to the not parked mode, the controller causes control shaft 155 to rotate clockwise (in FIG. 1) which translates park rod 120 to the right and causes cam portion 310 to more fully enter into park sleeve 125. In transition as park rod 120 continues to translate to the right, as shown in FIG. 5, forward portion 325 of cam portion 310 engages both cam follower portion 405 of park sleeve 125 and cam contact portion 340 of park pawl 115. Further translation of park rod 120 to the right rotates park pawl 115 counterclockwise (downward in FIG. 5) since forward portion 325 engages both park sleeve 125 and park pawl 115. At the completion of the translation of park rod 120 to the right, park pawl 115, park sleeve 125, and cam portion 310 have the relationship shown in FIG. 4 in which rearward portion 330 of cam portion 310 engages both park sleeve 125 and park pawl 115 in the parked mode. As long as the park lock device is configured as shown in FIG. 4, park pawl 115 cannot disengage from park lock gear 105 and forces exerted on cam portion 310 by park pawl 115 are not capable of translating park rod 120 to the left to enable disengagement. Only by translation of park rod 120 to the left, such as by rotation of control shaft 155 counterclockwise, will cam portion 310 transition to the intermediate mode shown in FIG. 5 to enable park pawl 115 to rotate clockwise (upwards in FIG. 4) and disengage from park lock gear 105.

Figure 6:
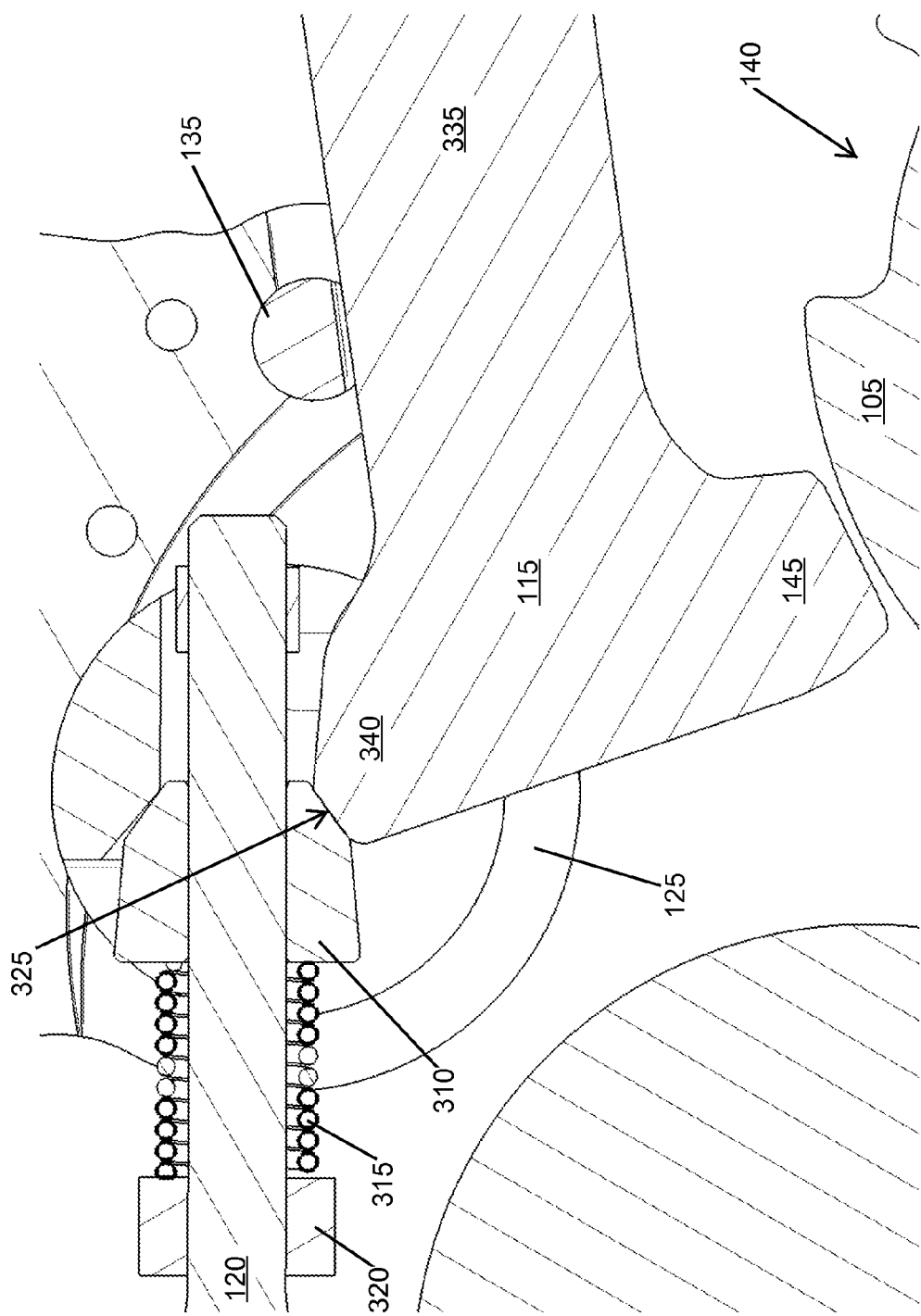
FIG. 6 illustrates a sectional view of a portion of the park lock device detailing an operational mode with a controller in parked position prior to the parking pawl engaging the park gear.

When the EV is travelling faster than the park lock engagement speed and control shaft 155 moves to the park position, the park lock device is required to avoid entering into the park mode. FIG. 6 illustrates a sectional view of a portion of the park lock device detailing an operational mode with the controller in the parked position prior to the parking pawl engaging the park gear. When the EV speed slows to the lock speed or slower, the park lock device automatically enters into the park mode in normal fashion as described herein.

Figure 7:
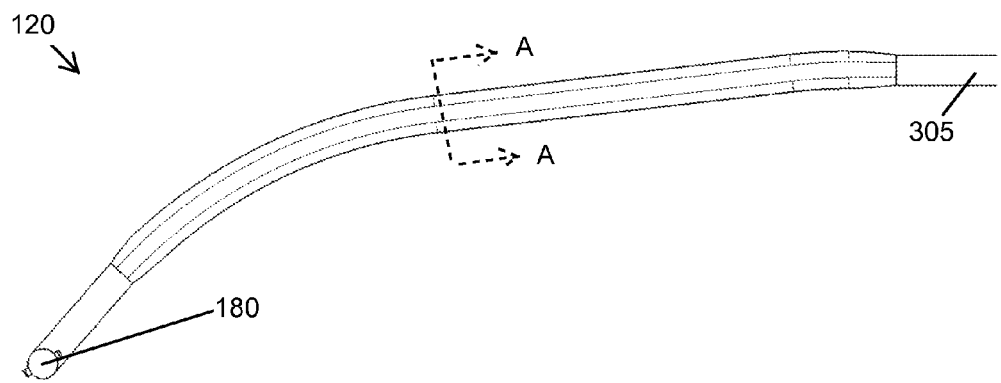
FIG. 7 illustrates a side view of the park rod.
Figure 8:
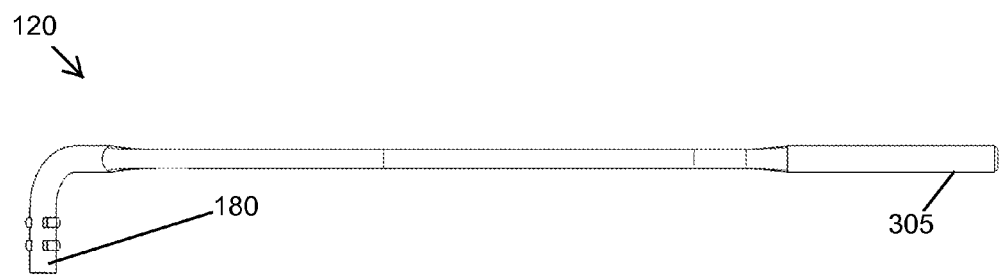
FIG. 8 illustrates a top view of the park rod.
Figure 9:
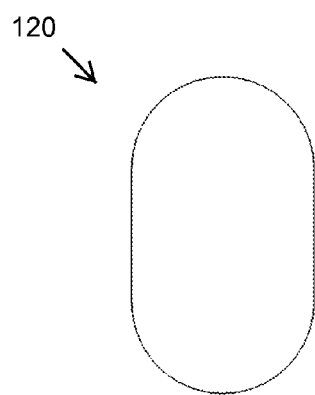
FIG. 9 illustrates a sectional view of a mid-portion of the park rod.

FIG. 7 illustrates a side view of park rod 120, FIG. 8 illustrates a top view of park rod 120, and FIG. 9 illustrates a sectional view of a mid-portion of park rod 120 about A-A identified in FIG. 7. During a skid torque mode, park pawl 115 can impart significant bending/buckling loads to park rod 120. Park rod 120 includes a mid-portion that has a cross-section which is generally oblong-shaped. The oblong having a major axis that is vertical. This oblong-shaped cross-section helps enable park rod 120 to better endure such skid torque mode.

FIG. 10 illustrates a top view of the park lock device components from FIG. 2 (park mode) isolated from the transmission case; and FIG. 11 illustrates a side view of the park lock device components of FIG. 10. A pair of bolts 1005 is shown securing bracket 190 in place. Also illustrated is an enlarged head 1010 for pawl shaft 150. Enlarged head 1010 interacts with a second half of the transmission case (not shown) that holds pawl shaft 150 in place while permitting it to freely turn. In this way no additional retention or mounting hardware is required, saving weight and decreasing component count.

Figure 12:
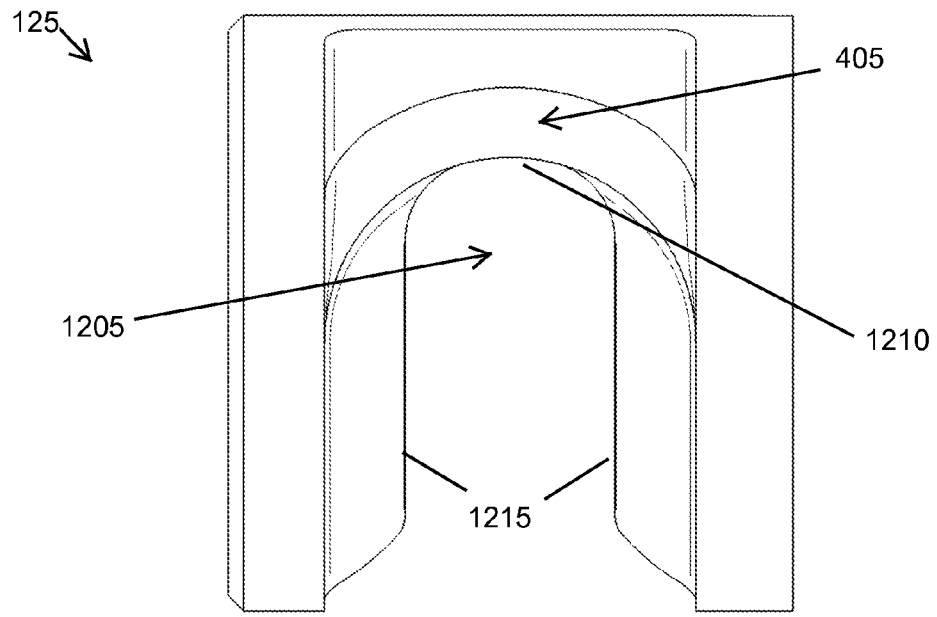
FIG. 12 illustrates an end view of the parking sleeve detailing an opening receiving the cam portion of the parking rod.
Figure 13:
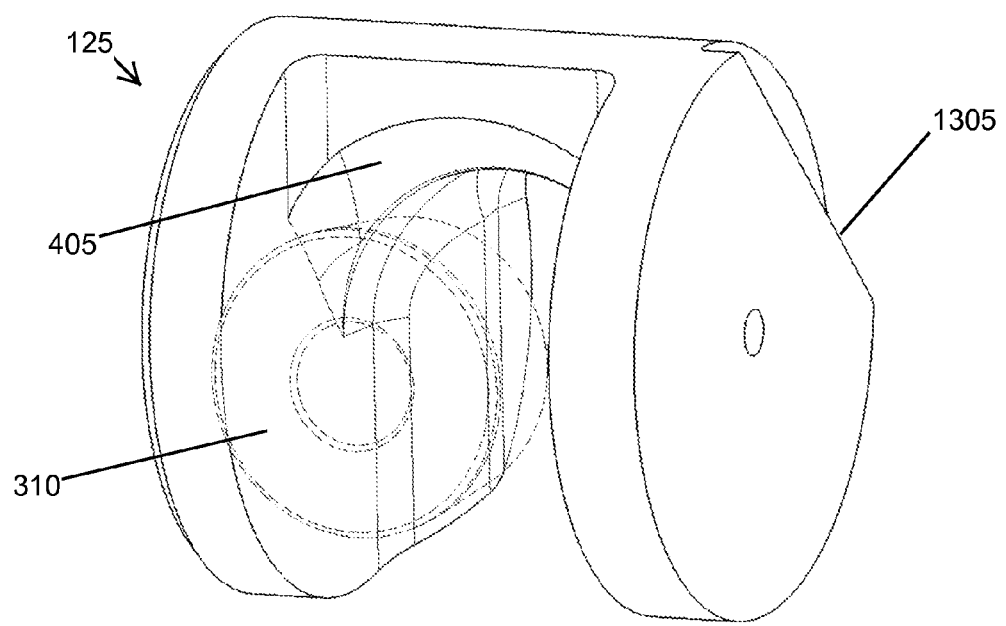
FIG. 13 illustrates an isometric view of the parking sleeve including receipt of the cam portion.

FIG. 12 illustrates an end view of park sleeve 125 detailing an opening 1205 receiving cam portion 310 of parking rod 120; and FIG. 13 illustrates an isometric view of park sleeve 125 including receipt of cam portion 310 within opening 1205. Parking rod 120 reciprocates in and out of opening 1205 with cam portion 310 engaging cam follower portion 405. To help locate and guide parking rod 120 in this operation, opening 1205 is provided with an upper stopper 1210 and a pair of side-to-side guides 1215. Upper stopper 1210 and side-to-side guides 1215 engage distal end 305 shown in FIG. 3 as it reciprocates to maintain operational alignment within the plane of the transmission. Opening 1205 does not include a lower stopper and is open opposite of cam follower portion 405 because cam contact portion 340 of park pawl 115 is located at this position. In this way park sleeve 125 sandwiches park pawl 115 (i.e., cam contact portion 340) and surrounds cam portion 310 with the aid of park pawl 115. Distal end 305 is guided and aligned without use of additional parts as is sometimes required in conventional systems. Also shown in FIG. 13 is a cutout 1305 on an exterior portion of park sleeve 125. Cutout 1305 cooperates with bracket 190 to provide rough rotational alignment of park sleeve 125 to properly orient opening 1205 and enable subsequent self-alignment.

The system and methods above has been described in general terms as an aid to understanding details of preferred embodiments of the present invention. In the description herein, numerous specific details are provided, such as examples of components and/or methods, to provide a thorough understanding of embodiments of the present invention. While the park lock device has been described in the context of a narrow transmission of the type commonly found in electric vehicles, the disclosed solution is applicable to other transmission systems and methods. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A park lock device of a narrow transmission, comprising:
   a park gear provided in a transmission case at a rotational axis which rotates together with a wheel axle;
   a park pawl provided in the transmission case so as to rotate about a pawl shaft coupled to a proximal end of said park pawl, said park pawl having a pawl portion at a distal end which locks said park gear through an engagement therebetween wherein said park pawl further includes a body portion coupling said proximal end to said distal end and a cam contact portion at said distal end opposing said pawl portion;
   a park rod provided in the transmission case so as to move together with an operation of a controller, said park rod having a cam portion which presses said cam contact portion of said park pawl so as to make said engagement between said pawl portion of said park pawl and said park gear according to said operation of said controller;
   a park sleeve receiving said cam portion of said park rod and defining a first contact point providing a reactive force to said cam contact portion of said park pawl pressing against said cam portion of said park rod at a second contact point;
   a pawl torsional spring, coupled to said pawl shaft, biasing a rotation of said park pawl about said pawl shaft towards a disengagement of said park gear and said pawl portion to unlock said park gear; and
   a pawl stopper provided in said transmission case to limit said rotation of said park pawl by contacting said body portion of said park pawl;
   wherein motion of said park gear, said park pawl, and said park rod are all constrained within a same vertical plane of said transmission case.

2. The park lock device of claim 1 wherein said pawl shaft, said park sleeve, and said pawl stopper each include a cylindrical exterior surface and a rotational axis parallel to each other.

3. The park lock device of claim 1 wherein said controller includes a control shaft that rotates between a parked position and a not parked position, the park lock device further comprising:
   a detent plate coupled to said control shaft with said detent plate defining a cam profile having a park position detent and a not parked position detent corresponding respectively to desired rotational positions for said parked position and not parked position of said control shaft; and
   a detent spring coupled to said detent plate and interacting with said cam profile to rotate said control shaft to one of said positions;
   wherein said cam portion of said park rod slidingly engages a tip of said park rod to move along said park rod between an extended position and a compressed position, wherein said cam portion is biased towards said tip and wherein said cam portion is retracted to said compressed position when said controller is in said park lock position and said pawl portion is disengaged from said park gear; and
   wherein said park rod includes a proximal end coupled to said detent plate, a distal end coupled to said tip, and a body portion extending therebetween, said ends having a generally circular cross-section and said body portion having a generally oblong cross-section, said generally oblong cross-section having a vertically disposed major axis of symmetry.

4. The park lock device of claim 3 wherein said park sleeve includes an opening defined by an upper wall portion and a pair of lateral wall portions, said opening receiving both said cam portion and said cam contact portion of said park pawl to sandwich said cam portion and said park pawl between said pair of lateral wall portions and position them within a concentric circle.

5. The park lock device of claim 1 wherein said park sleeve includes a cylindrical perimeter in a direction transverse to said transmission case with said park sleeve rotatable about a first transverse axis to self-align in response to said cam portion contacting said first contact point.

6. The park lock device of claim 5 wherein said park sleeve self-aligns such that a park cam line of action is substantially perpendicular to a first line connecting said first contact point to said first transverse axis and substantially perpendicular to a second line connecting said second contact point to said first transverse axis.

7. The park lock device of claim 6 wherein a first distance from said first contact point to said first transverse axis is substantially equal to a second distance from said second contact point to said transverse axis.

8. The park lock device of claim 7 wherein said body portion of said park pawl contacts said pawl stopper at a body contact point and wherein said pawl stopper includes a generally cylindrical exterior surface perpendicular to an outer wall of said transmission case wherein said generally cylindrical exterior surface engages said outer wall with a pawl contact portion of said pawl stopper defined by a flat chord portion of said pawl stopper, said pawl stopper rotatable about a second transverse axis to self-align in response to said body portion of said pawl contacting said pawl contact portion of said pawl stopper such that said flat chord portion is generally parallel to said pawl body at said body contact point.

9. The park lock device of claim 8 further comprising a bracket retaining both said park sleeve and said pawl stopper to said transmission case while allowing said park sleeve to self-align about said first transverse axis and allowing said pawl stopper to self-align about said second transverse axis.

10. The park lock device of claim 1 wherein said body portion of said park pawl contacts said pawl stopper at a body contact point and wherein said pawl stopper includes a generally cylindrical exterior surface perpendicular to an outer wall of said transmission case wherein said generally cylindrical exterior surface engages said outer wall with a pawl contact portion of said pawl stopper defined by a flat chord portion of said pawl stopper, said pawl stopper rotatable about a second transverse axis to self-align in response to said body portion of said pawl contacting said pawl contact portion of said pawl stopper such that said flat chord portion is generally parallel to said pawl body at said body contact point.

11. The park lock device of claim 1 wherein said pawl shaft freely rotates between said engagement and said disengagement, said pawl shaft disposed in a bore of a first half of said transmission case, said pawl shaft including a head cooperative with a second half of said transmission case to retain said pawl shaft within said bore.

12. The park lock device of claim 1 wherein a perimeter of said park gear defines a number N of distributed concave portions, each concave portion having a uniform profile, wherein said pawl portion engages one of said concave portions for said engagement.

13. The park lock device of claim 12 wherein said cam portion of said park rod slidingly engages a tip of said park rod to move along said park rod between an extended position and a compressed position, wherein said cam portion is biased towards said tip, and wherein said cam portion includes a cam portion profile defining a steep slope towards said tip and a shallow slope inboard of said steep slope, with said contact points engaging said shallow slope for said engagement of said park gear, and with said contact points engaging said steep slope when said controller is in said locked position and said pawl portion is not engaged with one of said concave portions.

14. The park lock device of claim 1 wherein said park sleeve includes an opening defined by an upper wall portion and a pair of lateral wall portions, said opening receiving both said cam portion and said cam contact portion of said park pawl to sandwich said cam portion and said park pawl between said pair of lateral wall portions and position them within a concentric circle.

15. The park lock device of claim 14 wherein said upper wall portion includes an upper stopper and wherein each lateral wall portion includes a side guide, said upper stopper and said side guides guiding said tip of said park rod as said park rod enters into said opening.

* * * * *